(12) United States Patent
Tuxen et al.

(10) Patent No.: US 11,951,372 B2
(45) Date of Patent: Apr. 9, 2024

(54) SYSTEM AND METHOD FOR TRACKING SPORTS BALLS

(71) Applicant: TRACKMAN A/S, Vedbaek (DK)

(72) Inventors: Fredrik Tuxen, Rungsted Kyst (DK); Michael Ungstrup, Vedbaek (DK)

(73) Assignee: TRACKMAN A/S, Vedbaek (DK)

( * ) Notice: Subject to any disclaimer, the term of this patent is extended or adjusted under 35 U.S.C. 154(b) by 160 days.

(21) Appl. No.: 17/248,293

(22) Filed: Jan. 19, 2021

(65) Prior Publication Data

US 2021/0220718 A1 Jul. 22, 2021

Related U.S. Application Data

(60) Provisional application No. 62/963,868, filed on Jan. 21, 2020.

(51) Int. Cl.
*A63B 69/36* (2006.01)
*A63B 24/00* (2006.01)
*A63B 71/06* (2006.01)

(52) U.S. Cl.
CPC ...... *A63B 69/3623* (2013.01); *A63B 24/0006* (2013.01); *A63B 24/0021* (2013.01); *A63B 71/0605* (2013.01); *A63B 71/0622* (2013.01); *A63B 2024/0009* (2013.01); *A63B 2024/0034* (2013.01); *A63B 2024/0056* (2013.01); *A63B 69/3605* (2020.08); *A63B 2071/0647* (2013.01); *A63B 2220/30* (2013.01); *A63B 2220/806* (2013.01); *A63B 2220/89* (2013.01)

(58) Field of Classification Search
CPC ............ A63B 69/3623; A63B 24/0006; A63B 24/0021; A63B 71/0605; A63B 71/0622; A63B 69/3605; A63B 2024/0009; A63B 2024/0034; A63B 2024/0056; A63B 2071/0647; A63B 2220/30; A63B 2220/806; A63B 2220/89; A63B 24/0075; A63B 2102/32; G09B 19/0038
See application file for complete search history.

(56) References Cited

U.S. PATENT DOCUMENTS 5,365,427 A * 11/1994 Soignet ................. A63B 69/00
473/448
10,179,263 B2 * 1/2019 Burroughs ......... A63B 24/0062
(Continued)

FOREIGN PATENT DOCUMENTS

CN 102470267 5/2012
CN 103502987 1/2014
(Continued)

*Primary Examiner* — Jeffrey S Vanderveen
(74) *Attorney, Agent, or Firm* — Fay Kaplun & Marcin, LLP

(57) ABSTRACT

A system for determining potential changes in trajectories of golf shots includes a sensor array sensing swing data relating to a golfer's swing and trajectory data relating to the trajectories of each of a plurality of shots hit by the golfer and a computing arrangement including a data repository and a processor configured to: store in the data repository the swing data and the trajectory data; identify shots hit by the golfer that represent mishits; and determine output data based on the swing data and the trajectory data for all of the shots hit by the golfer that are not identified as mishits, the output data indicating an optimal shot achievable by the golfer.

20 Claims, 9 Drawing Sheets

(56) References Cited

U.S. PATENT DOCUMENTS

| | | | |
|---|---|---|---|
| 11,086,008 B2* | 8/2021 | Du Toit | G01S 19/19 |
| 2003/0073518 A1* | 4/2003 | Marty | A63B 69/0071 |
| | | | 473/422 |
| 2006/0166737 A1* | 7/2006 | Bentley | A63B 69/36 |
| | | | 463/43 |
| 2009/0088275 A1* | 4/2009 | Solheim | A63B 69/3605 |
| | | | 473/409 |
| 2009/0209358 A1 | 8/2009 | Niegowski | |
| 2010/0121227 A1 | 5/2010 | Stirling et al. | |
| 2010/0151956 A1* | 6/2010 | Swartz | A63B 60/42 |
| | | | 473/409 |
| 2010/0234769 A1 | 9/2010 | Poliac et al. | |
| 2011/0276153 A1* | 11/2011 | Selner | A63B 69/3608 |
| | | | 473/409 |
| 2013/0184091 A1* | 7/2013 | Rauchholz | A63B 60/22 |
| | | | 473/238 |
| 2014/0234814 A1 | 8/2014 | Krosky et al. | |
| 2018/0200605 A1* | 7/2018 | Syed | A63B 69/3605 |
| 2020/0222757 A1* | 7/2020 | Yang | G06V 40/23 |

FOREIGN PATENT DOCUMENTS

| | | | | |
|---|---|---|---|---|
| CN | 105999677 | 10/2016 | | |
| CN | 107206272 | 9/2017 | | |
| CN | 110270077 | 9/2019 | | |
| JP | 2001-293120 | 10/2001 | | |
| JP | 2003-507150 | 2/2003 | | |
| JP | 2003-126321 | 5/2003 | | |
| JP | 2011-183138 | 9/2011 | | |
| JP | 2012-531941 | 12/2012 | | |
| WO | 2005/035076 A2 | 4/2005 | | |
| WO | WO-2005035076 A2 * | 4/2005 | ......... | A63B 24/0021 |
| WO | 2011/002225 A2 | 1/2011 | | |
| WO | WO-2011002225 A2 * | 1/2011 | ......... | A63B 24/0021 |

* cited by examiner

| TRACKMAN | | | | | | | PGA TOURS AVERAGES | | | WWW.TRACKMANGOLF.COM |
|---|---|---|---|---|---|---|---|---|---|---|
| | CLUB SPEED (MPH) | ATTACK ANGLE (DEG) | BALL SPEED (MPH) | SMASH FACTOR | LAUNCH ANG. (DEG) | SPIN RATE (RPM) | MAX. HEIGHT (YDS) | LAND ANGLE (DEG) | CARRY (YDS) |
| DRIVER | 113 | -1.3° | 167 | 1.48 | 10.9° | 2686 | 32 | 38° | 275 |
| 3-WOOD | 107 | -2.9° | 158 | 1.48 | 9.2° | 3655 | 30 | 43° | 243 |
| 5-WOOD | 103 | -3.3° | 152 | 1.47 | 9.4° | 4350 | 31 | 47° | 230 |
| HYBRID 15-18" | 100 | -3.5° | 146 | 1.46 | 10.2° | 4437 | 29 | 47° | 225 |
| 3-IRON | 98 | -3.1° | 142 | 1.45 | 10.4° | 4630 | 27 | 46° | 212 |
| 4-IRON | 96 | -3.4° | 137 | 1.43 | 11.0° | 4836 | 28 | 48° | 203 |
| 5-IRON | 94 | -3.7° | 132 | 1.41 | 12.1° | 5361 | 31 | 49° | 194 |
| 6-IRON | 92 | -4.1° | 127 | 1.38 | 14.1° | 6231 | 30 | 50° | 183 |
| 7-IRON | 90 | -4.3° | 120 | 1.33 | 16.3° | 7097 | 32 | 50° | 172 |
| 8-IRON | 87 | -4.5° | 115 | 1.32 | 18.1° | 7998 | 31 | 50° | 160 |
| 9-IRON | 85 | -4.7° | 109 | 1.28 | 20.4° | 8647 | 30 | 51° | 148 |
| PW | 83 | -5.0° | 102 | 1.23 | 24.2° | 9304 | 29 | 52° | 136 |

FIG. 9

SYSTEM AND METHOD FOR TRACKING SPORTS BALLS

PRIORITY CLAIM

This application claims priority to U.S. Provisional Patent Application Ser. No. 62/963,868 filed Jan. 21, 2020. The specification of the above-identified application is incorporated herewith by reference.

BACKGROUND INFORMATION

In today's technologically evolved world, athletes using sports balls are getting more and more access to measurement equipment giving information about the trajectory of the sports ball as well as their launch motion (e.g., the swinging of a club or bat, kicking or throwing motion, etc.) in relation to the launching of the sports ball.

To improve efficiently, these measurements and various parameters must be synthesized to create a system that enables the most efficient improvement in performance.

For example, in golf, the interplay between various factors in the swing as well as equipment choices is too complex for monitoring and analysis by any human being such as a conventional coach. It becomes even more complex and further beyond human capabilities to determine a course of practice to generate improvements when considering the interplay between equipment and bio-mechanical reactions to any adjustment much less to quantify the potential gains of any given course of action.

SUMMARY

The present embodiments are related to a system for determining potential changes in trajectories of golf shots comprising a sensor array sensing swing data relating to a golfer's swing and trajectory data relating to the trajectories of each of a plurality of shots hit by the golfer and a computing arrangement including a data repository and a processor configured to: store in the data repository the swing data and the trajectory data; identify shots hit by the golfer that represent mishits; and determine output data based on the swing data and the trajectory data for all of the shots hit by the golfer that are not identified as mishits, the output data indicating an optimal shot achievable by the golfer.

The present embodiments provide a system for tracking sports balls and analyzing player performance to generate a plan for efficient improvement eliminating or reducing the need for a professional sports coach or instructor. The present embodiments include a system including one or more sensors measuring the ball trajectory as well as data regarding the swing, kick, throw, etc. that launches the ball into the achieved sports ball trajectory. The system may operate over time to learn the impact of the measured parameters on the launching motion (e.g., swing, kick, throw, etc.) to calculate the impact of changes to these parameters on the resulting sports ball trajectory. Based on this learning, the system identifies which launch motion parameters to change and the desired degree of change to improve the performance of the athlete.

By tracking launched sports balls, the present embodiments benchmark an athlete's performance in one or more performance scores permitting the calculation by the system of the impact on the athlete's performance of different possible launch motion and/or equipment changes enabling the development of a plan for the athlete identifying changes that will have the greatest positive impact on performance. These calculations cannot be carried out by a coach or instructor as the physics and the interaction between multiple parameters are very complex. With human coaches a more limited focus is required as it would be nearly impossible for anyone to calculate the complex results of one parameter change on the multiple additional parameters that may be impacted by any change.

To understand the nature of the learning of the system as to how changes to the launch motion impacts a sports ball trajectory, consider the following examples from golf.

When a right-handed golfer's club path is detected as being to the left of the face angle of the club face (e.g., a so called "open face to path"), the ball will generally be imparted with a spin about a spin axis tilted to the right (e.g., which may be confirmed and measured by the ball tracking system), which generally results in a ball trajectory that will curve to the right.

If the detected club speed is increased while everything else remains the same, the detected ball speed and spin rate will generally increase. This will also generally result in a detected ball trajectory that is higher and longer.

If a detected point of impact of the ball on the club face is spaced from a center of gravity of the clubhead projected onto the club face, the detected ball speed will likely drop and a detected curvature of the trajectory may also be impacted.

If a detected attack angle of the club head is increased, the detected trajectory of the ball after launch will generally be steeper (closer to vertical) resulting in a higher detected ball trajectory.

However, due to the complex biomechanics of the golf swing, a change to any one of these variables will likely result in changes to others that may vary considerably from individual to individual. The present disclosure may build from experience models for each of a plurality of golfers so that the impact of a change addressing one variable may be confidently predicted. For example, data corresponding to the various parameters (e.g., biomechanical, equipment related, etc.) from many prior shots from the golfer himself and/or from many other golfers may be used to train a neural network to develop a model for predicting the results of any single change on the performance of the golfer. Similar issues are raised by the complexities of the launch motions of other sports activities and are addressed by the present embodiments in similar manners.

BRIEF DESCRIPTION OF THE DRAWINGS

FIG. 9 shows the average club delivery and ball launch and landing conditions for male golf players measured by a golf shot tracking system.

DETAILED DESCRIPTION

Figure 1:
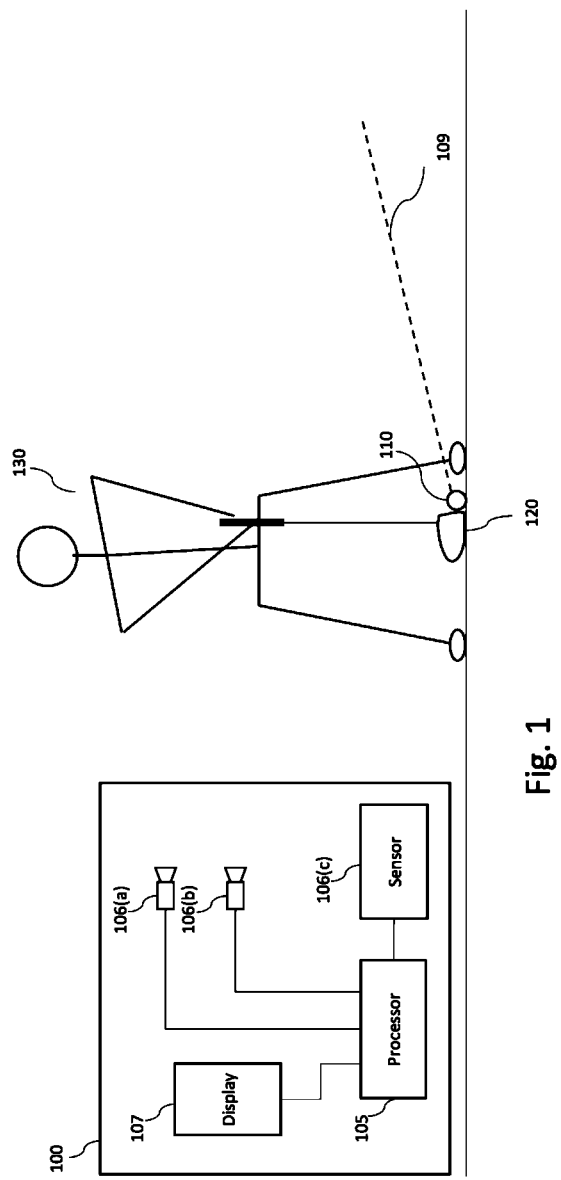
FIG. 1 shows a system which may for a golfer measure golfer performance, determine golfer characteristics and determine one or more impactful ways of improving performance of the golfer according to an embodiment.

The exemplary embodiments may be further understood with reference to the following description and the related appended drawings, wherein like elements are provided with the same reference numerals.

In the following, a golfer hitting golf balls is used as an example for the present embodiments. However, those skilled in the art will understand that the same principles may be applied to various other sports where an athlete launches a sports object such as a sports ball by, for example, striking a ball directly (e.g., volleyball or soccer) striking a ball with a club or bat (e.g., cricket, baseball and golf) or throws of a sports ball with the intention of attaining a particular trajectory or final position of the sports ball.

Terms used in this application will define a coordinate system to describe the dynamic interaction between the club and the ball at impact. However, those skilled in the art will understand that any other coordinate system or system for analyzing the three-dimensional characteristics of the impact between a golf ball and a golf club (or between any sports ball impacting implement and a sports ball) may be employed without departing from the scope of the embodiments so long as the data derived enables one to understand the qualities of the resulting shots and to make predictions on methods for improving the same. In analyzing impact characteristics of a golf club with a golf ball, variables such as club path, attack angle, dynamic loft, face angle and dynamic lie are useful and may be understood in regard to a coordinate system with the origin being the ball location prior to impact. A first axis of the coordinate system may, for example, be a horizontal line from the ball to the intended target (e.g., the target direction) while a second axis of the coordinate system is a vertical line passing through the ball, with a third axis being a horizontal line perpendicular to the target direction completing the cartesian coordinate system.

Those skilled in the art will understand that, considering the three-dimensional direction of the golf club at the point of impact, the club path at the heel of the golf club is not the same as the club path at the toe of the golf club and thus the path of the actual position of impact between the ball and the club face may be different from either of these paths. However, for purposes of these embodiments, the point selected as the reference point in determining, for example, attack angle and club path (as defined below) may be any reference point selected on the club face to provide an indication of the dynamic relation between the ball and the club face at the time of impact. Thus, whether the center of the club face is selected as the reference point for determining the direction of the golf club, the geometric center of the club head or the center of mass of the club head is selected as the reference point, the movement of the selected reference point is determined relative to the ball at impact. The attack angle is defined as the vertical direction of the club head just prior to impact measured relative to the horizon, the club path is defined as the horizontal direction of the club head just prior to impact measured relative to the target direction. Similarly, those skilled in the art will understand that, considering the three-dimensional orientation of the golf club face at the point of impact, the face angle at the heel will not be the same as the face angle of the toe for clubs with pronounced bulge radius like a driver.

However, for purposes of these embodiments, the point selected as the reference point in determining, for example, dynamic loft and face angle (as defined below) may be any reference point selected on the club face to provide an indication of the dynamic relation between the ball and the club face at the time of impact. Thus, whether the center of the club face is selected as the reference point for determining the direction of the golf club, the point of impact with the ball on the club face is selected as the reference point, the orientation of the selected reference point is determined relative the ball at impact. The dynamic loft is defined as the vertical angle of the club face normal (e.g., 90 degrees to the club face) at the reference point on the club face at time of impact, measured relative to the horizon, i.e., the amount of loft on the club face at impact. Similarly, the face angle is defined as the club face normal (e.g., 90 degrees to the club face) at the reference point at time of impact, measured in the horizontal plane relative to the target direction.

FIG. 1 shows a first system 100 for determining golfer characteristics and for identifying most impactful ways of improving the golfer's capabilities. A golfer 130 swings a golf club 120 and launches a golf ball 110 on a ball trajectory 109. The system 100 contains one or more sensors 106 that record swing and shot parameters as will be described in more detail below.

The swing and shot parameters include ball data sufficient to predict a trajectory of the golf ball and an approximate ending position of the ball (i.e., a final resting place of the ball after it has landed, bounced and rolled to a stop). This can be done, for example, by measuring the full ball trajectory with camera and/or radar based sensor system 100 (or a system combining radar and camera tracking), or the system 100 may measure the ball launch conditions such as ball speed, launch angle, launch direction, spin rate and spin axis with accuracy sufficient to enable calculation of the golf ball trajectory using predetermined information about golf ball aerodynamics and environmental conditions such as temperature, pressure, wind speed and direction and ground conditions, as would be understood by those skilled in the art.

In addition to determining the golf ball trajectory, the system 100 also measures at least one swing parameter that correlates with the resulting ball trajectory, the swing parameter(s) being related to the golfers swing motion and/or club delivery. In the preferred environment, the club delivery parameters include club speed, club path, face angle, attack angle, dynamic loft of the club face and impact location on the club face. However, additional swing parameters of the golfer 130 such as position and angular orientation of the club head, the hands, shoulders, hips, pelvis and spine during the execution of the golfer's swing are relevant parameters and may also be measured. These swing motion parameters may also be used to determine both linear and angular speeds which are part of the kinematic sequence which is critical in generating the intended club delivery as well as making these actions reliably repeatable.

Figure 3:
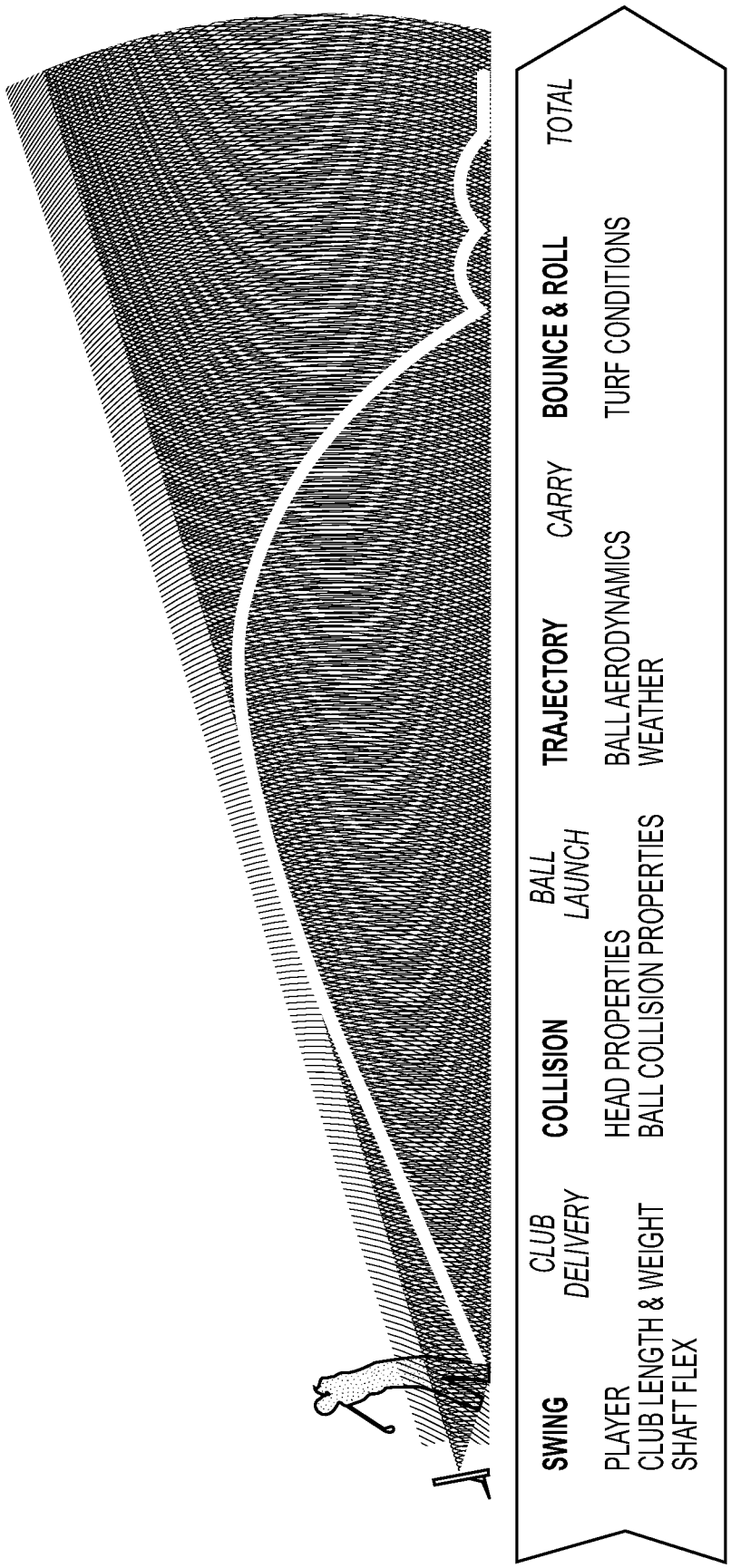
FIG. 3 shows a logical sequence of events determining the trajectory of a hit golf ball.
Figure 4:
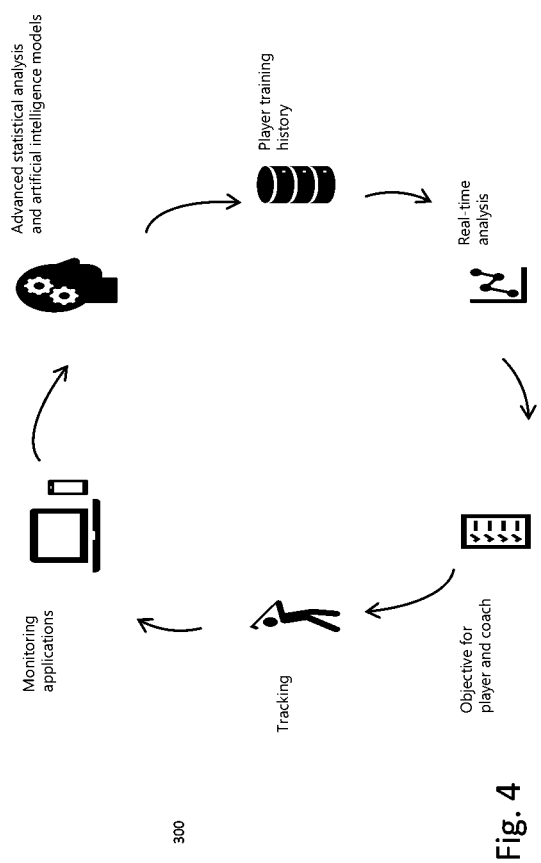
FIG. 4 illustrates a golfer improvement cycle supported by the present embodiments.

FIG. 3 illustrates a sequence of events that launches a sports ball on a trajectory along with the ball's continued travel after landing as it bounces and rolls to a final resting spot. The sequence begins with the golfer's movement of arms, legs, shoulders, etc., via which the golfer delivers the club head to the ball with a certain orientation, direction and speed. The movement of the club head in response to the golfer's movements is also influenced by the construction of the golf club (e.g., mass of club head, length and rigidity of the shaft). Thus, the club face of the club head impacts the ball so that the ball is launched with initial ball launch conditions and then flies aerodynamically through the air until it hits the ground under some landing conditions (e.g., angle, speed and spin rate) and, depending on the turf conditions (e.g., firmness, angle of the impact area to the horizontal, etc.) the ball bounces and/or rolls to its final resting position.

In the system 100, the sensors 106 may include, for example, cameras 106(a-b) and/or radars 106(c), but, as would be understood by those skilled in the art, may include any sensor or combination of sensors of different types capable of measuring any of the shot parameters of the ball trajectory and club delivery and/or swing motion parameters, including, for example, lidar, ultrasonic, acoustic or magnetic sensors, accelerometers, etc. Some of the parameters might also be determined based on data from sensors attached to either the golfer 130, the golf club 120, the golf ball 110 or any combination of such sensors. However, when possible the sensors 106 are contact free for the golfer and do not require modification of either the golf club or the ball, for ease of use by the golfer.

The system 100 includes a processor 105 that records and analyzes the swing and shot parameters sensed by the sensors 106. The processor 105 determines, based on the recorded parameters, and stored data (if any has already been generated) related to the golfer's performance, the golfer characteristics (e.g., historical data relevant to the swing and shot characteristics of the golfer), generates or updates a benchmarking of the golfer and recommends to the golfer improvements designed to improve the benchmarking. The benchmarking results may be presented to the golfer, for example, by a display 107, but may also be delivered via an audio device, an electronic or printed report or any other suitable output means.

The benchmarking of the golfer typically happens for a particular club type (e.g., a 6 iron), but may also be a general benchmarking for all the club types hit by the golfer or a group of clubs like woods, hybrids, irons, long irons, short irons or wedges. Typically, the benchmarking will not vary significantly from club type to club type for a golfer (e.g., a 6 iron and a 7 iron) so combining club types in groups before benchmarking may be desirable as this will reduce data storage and processing requirements and allow for more efficient system operation.

As would be understood by those skilled in the art, the cameras 106(a-b) may operate in the visual frequency domain and/or the near infrared or infrared domain. The cameras 106(a-b) may be color or monochromatic and may include a light system operable therewith to ensure proper illumination during the recording. The camera will typically operate between 100 and 10,000 frames per second for recording the club delivery, swing motion parameters and ball shot parameters. For cameras used to measure a golfer's hands, arms, shoulders, hip movement, etc., and determine the swing motion parameters, a slower framerate, such as 30 fps, may be employed as these items are moving more slowly than the club head.

As would be understood by those skilled in the art, a high frame rate may be especially useful where the interaction between the club head and the ball is to be observed as this impact includes dynamic elements that occur over very short time frames. For detecting club head position and orientation at impact with the ball from images, a minimum number of frames (e.g., 2-3) is needed prior to impact. These detections need to be sufficiently distributed relative to the impact time in order to accurately observe the club delivery immediately prior to contact with the ball. Frames may also be used post impact, but due to the collision with the ball and possibly the ground, the club head may be deflected after impact to another path not easily related to the golfer's swing. Typically, 4-10 frames are desired pre-impact on the club, which in turns sets a limit on the field-of-view of the camera as well as the framerate, assuming the maximum club head speed for a golfer is, for example, 150 mph. If the images are also used to determine the speed, direction and spin of the launched ball, then a similar number of 4-10 frames is typically necessary to get accurate ball launch data. For determining a precise impact time with the ball, it is desirable to employ a framerate of 2000 fps or higher. The contact time between the club and the ball is typically 0.5 ms, which means, at 2000 fps, one is guaranteed to have a frame during which the ball is in contact with the club head.

The radar 106(c) may be, for example, a continuous wave Doppler radar emitting microwaves at an X-band frequency (e.g., 10 GHz) at a power of up to 500 milli-Watts EIRP (Equivalent Isotropic Radiated Power), thus being compliant with FCC and CE regulations for short range international radiators. However, in other jurisdictions, other power levels and frequencies may be used in compliance with local regulations. In an exemplary embodiment, microwaves are emitted at a higher frequency between, for example, 5-125 GHz. For more precise measurements at lower object speeds, frequencies of 20 GHz or higher may be used. Any type of continuous wave (CW) Doppler radar may be used, including phase or frequency modulated CW radar, multi frequency CW radar or a single frequency CW radar.

It will be understood that other tracking devices such as lidar may be used with radiation in either the visible or non-visible frequency region. Current-pulsed radar systems are limited in their ability to track objects close to the radar device. However, the distance an object must be from these pulsed radar systems has decreased over time and is expected to continue to decrease. Thus, these types of radar may soon be effective for these operations and their use in the systems of the present disclosure described below is contemplated. Throughout the application, the tracking of objects is described based on the use of Doppler frequency spectrums. As would be understood, these Doppler frequency spectrums refer to the Doppler spectrum from any type of radar or lidar used.

The system 100 further includes a processing unit which, as would be understood by those skilled in the art, may include one or more processors 105 in communication with the sensors 106, which may include cameras 106(a-b) and/or radar 106(c) (or multiple radar devices) via, for example, a wired or wireless connection data storage devices, etc. In an embodiment the processor 105 includes a computer associated with the sensors 106. The processor may also have attached a machine-readable medium for the storing code as well as historical data. The processor may be a handheld device, a personal computer, an embedded computer or may possibly also be located in the cloud or any other type of remote computing device.

Figure 2:
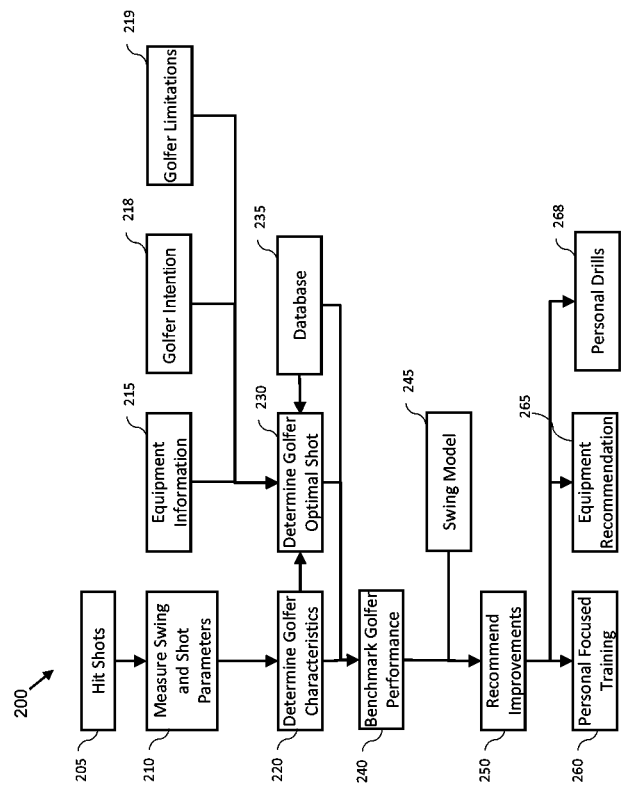
FIG. 2 shows a flowchart describing a method for determining golfer characteristics and determining the impactful ways for improving the performance of the golfer according to the embodiment.

FIG. 2 shows a process 200 according to an exemplary embodiment. In step 205, the golfer 130 hits one or more golf shots. For each golf shot, the swing and shot parameters are detected by the system 100 and recorded in step 210. The recorded data is then analyzed in step 220 to determine swing and shot characteristics for the golfer 130 in step 220. The processor 105 may during this analysis identify certain of the shots as well struck and identify these well struck shots as representative of the potential of the golfer 130 while identifying shots that are less successfully executed as representative of errors or poor swings of the golfer 130.

Figure 5:
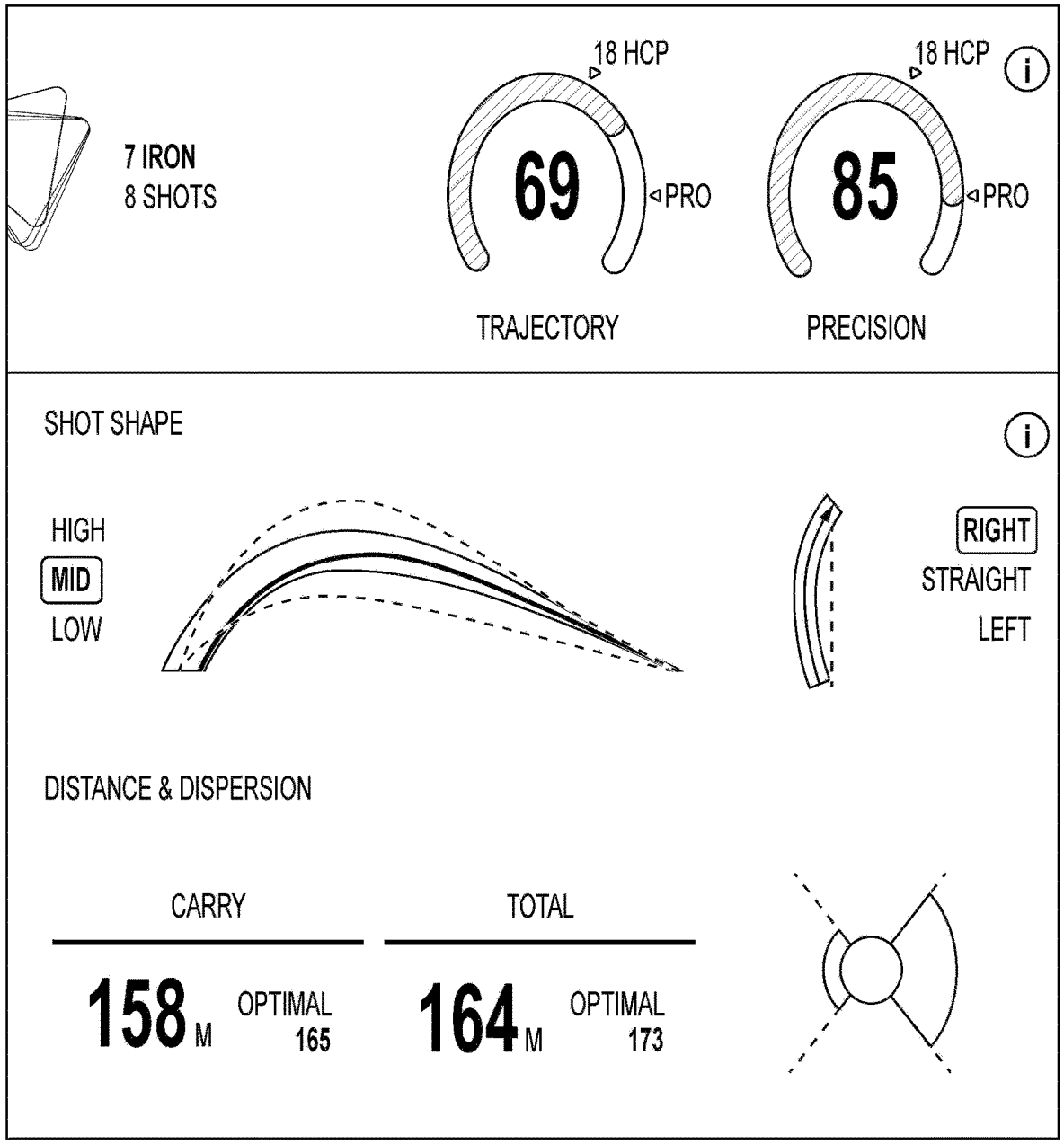
FIG. 5 shows an example of a display of golfer benchmarking and golfer characteristics.

Typically, a golfer is evaluated by both his/her capability in terms of how far and how efficiently they can hit the ball when the ball is well struck, as well as how reliably they repeat this type of well struck shot. So, when determining the golfer's characteristics in step 220, for a portion of the analysis (e.g., in determining a repeatability level for a particular shot type), all shots will be used, whereas for other analysis (e.g., evaluating the efficiency with which power is delivered to the ball), certain shots might be omitted (e.g., shots identified as poorly struck). The golfer characteristics determined in step 220 are preferably shared with the golfer. This may take a form such as: "You hit the ball 158 m carry with a left to right curve with medium height trajectory. 50% of your shots end up to the right of your target line". This may also be shown graphically as shown in FIG. 5.

While it is preferable to determine the golfer characteristics from measurements by the system 100, the golfer characteristics may also be input by the user, like "My club speed is usually 80 mph with my 6 iron and the shot shape is typically a high fade and my distance is 150 m".

The system 100 may also incorporate input from the golfer in performing the shot analysis. In step 218, the golfer may input an intention, for example, the golfer may input an intention to hit a particular distance, a particular shot shape (e.g., draw, fade or straight), a particular height (e.g., low, mid or high), or a particular spin rate (e.g., low, mid or high) or any combination of such intentions. If no golfer intention 218 is available, the system 100 may, for example, assume as the intention a repeatable well struck shot landing on the target line with same distance as previous well struck shots using the same club.

The golfer 130 may also have limitations (e.g., reduced flexibility, reduced strength, etc.) that affects the capabilities of the golfer. These may be input to the system 100 in step 219. The limitations might also be related to information about the golfer's height, length of arms and legs and general body dimensions.

In step 215, the golfer 130 may input details about the equipment he/she is using, such as club type (e.g., driver, 3 wood, 2 hybrid, 7 iron, 54 degrees wedge, etc.), shaft flex (e.g., regular, soft, stiff, extra stiff) and/or ball information (e.g., premium ball, 2 pieces ball, range ball, etc.). The information might also include more detailed information such as club head mass, static loft, location of center of gravity, moment of inertia, coefficient of restitution, lie angle; shaft length, weight, flex profile, grip type; and/or ball weight, coefficient of restitution, friction properties etc.

The system 100 may also automatically determine the equipment information in step 215 based on data from the sensors 106. For example, the club type or at least club category (e.g., driver, wood, hybrid, iron, wedge or putter) may be determined by identifying the equipment from images taken by the sensor 106(*a-b*) based on classifications made, for example, using machine learning based networks or other type of classification techniques.

Based on the golfer characteristics determined in step 220, any equipment details determined in step 215, and any golfer intention information input in step 218 as well as any golfer limitations input in step 219, the processor 105 determines optimal, yet achievable shot parameters for the golfer as well as club delivery and swing motion parameters associated with such an optimal shot in step 230. In determining what is achievable by the golfer, the system 100 may include a priori knowledge as to which aspects of the golfer's swing are easier to change than others.

For example, changing the face angle, the impact location on the club face, the attack angle or club path of the golfer may be relatively easy, whereas changing the club speed may be more difficult. This ranking of the ease with which certain changes may be implemented will impact the recommendations the system 100 generates as will be described in more detail below. As would be understood by those skilled in the art, the ease of correction of these characteristics may be adjusted by the system 100 based on the amount of room for improvement in any aspect of the golfer's swing (i.e., as a golfer implements suggestions and the difference between a current swing characteristic and achievable optimum decreases, changes to other characteristics may be ranked as more promising).

In step 235, the system 100 accesses a database of stored information to determine an optimal shot for the golfer. For example, the system 100 may retrieve from the database in step 235 information relating to how to efficiently hit a ball with a given club speed with a shot shape which that matches as closely as possible the characteristics determined for the golfer in step 220. This database may, for example, include data corresponding to thousands of shots from professional golfers and/or may include an artificial model golfer that is adapted to match as closely as possible the current golfer by adjusting parameters to match the golfer characteristics determined in step 220. The golfer's optimal shot may be determined in step 230, by employing a neural network to identify which of the many stored optimal trajectories in the database 235 (e.g., including data regarding multiple shots from multiple golfers using different varieties of equipment) most closely matches the golfer characteristics determined in step 220 or based on learned historical data as to the optimal trajectory most easily achievable given the golfer characteristics determined in step 220 (e.g., based on an analysis of the changes in performance of golfers identified as having similar relevant characteristics where the changes in performance followed specific recommendations for practice etc. from similar starting points).

The trajectory identified as optimal may depend on many factors that are impossible for a human to consider effectively. For example, for a Driver shot, the optimal ball trajectory is generally considered to be the one that maximizes distance from the launch location to the final resting place of the ball while minimizing the spread away from a target line for the final position of the ball. However, some players may want to value the carry distance (e.g., the distance from the launch location to the point at which the ball first contacts the ground) more highly than the distance to the final rest position of the ball. This preference may be input by a user.

The optimal trajectory for the final rest position will vary depending on the turf conditions. For very hard turf conditions, the longest final rest position will often be associated with trajectories with a lower flight and thereby a more shallow landing angle compared to higher ball trajectories that maximize the carry distance. The optimal trajectory for a driver will also depend on the environmental conditions. At higher altitudes where the density of the air is lower, the optimal trajectory will in general have a higher launch angle compared to the optimal trajectory at lower altitudes. Also, the wind conditions will have an influence on the optimal trajectory. When playing links courses the wind is typically very strong. This makes lower ball trajectories with less time in the air and with lower apex height, where the wind speed is typically lower, more optimal. However, when playing park courses, where trees limit the wind speed affecting the ball, higher ball trajectories may be more optimal. The purposes, and thereby the optimal trajectory, with club types other than Driver are not necessarily to optimize the shot distance.

For example, shot types with these other club types are primarily to hit the ball a certain distance with a full swing of the golfer to reach a certain target area and control where the ball ends up. Depending on the distance to hit (e.g., the distance from the current position of the ball to a desired final resting place of the ball) and the turf and environmental conditions, the optimal trajectory will vary for the golfer. If, for example, a green is very soft, it may be preferable to have a high ball trajectory so the amount of bounce and roll is minimized. On the other hand, if the green is very hard, it is often preferable to land ball outside the green and let the ball bounce and roll onto the green. Defining what is the optimal trajectory that defines the optimal shot is a very complex problem that typically involves many complex calculations taking into account many variables relating to the golfer, the equipment, the environmental and turf conditions, etc. that is not possible for a human to perform.

Figure 6:
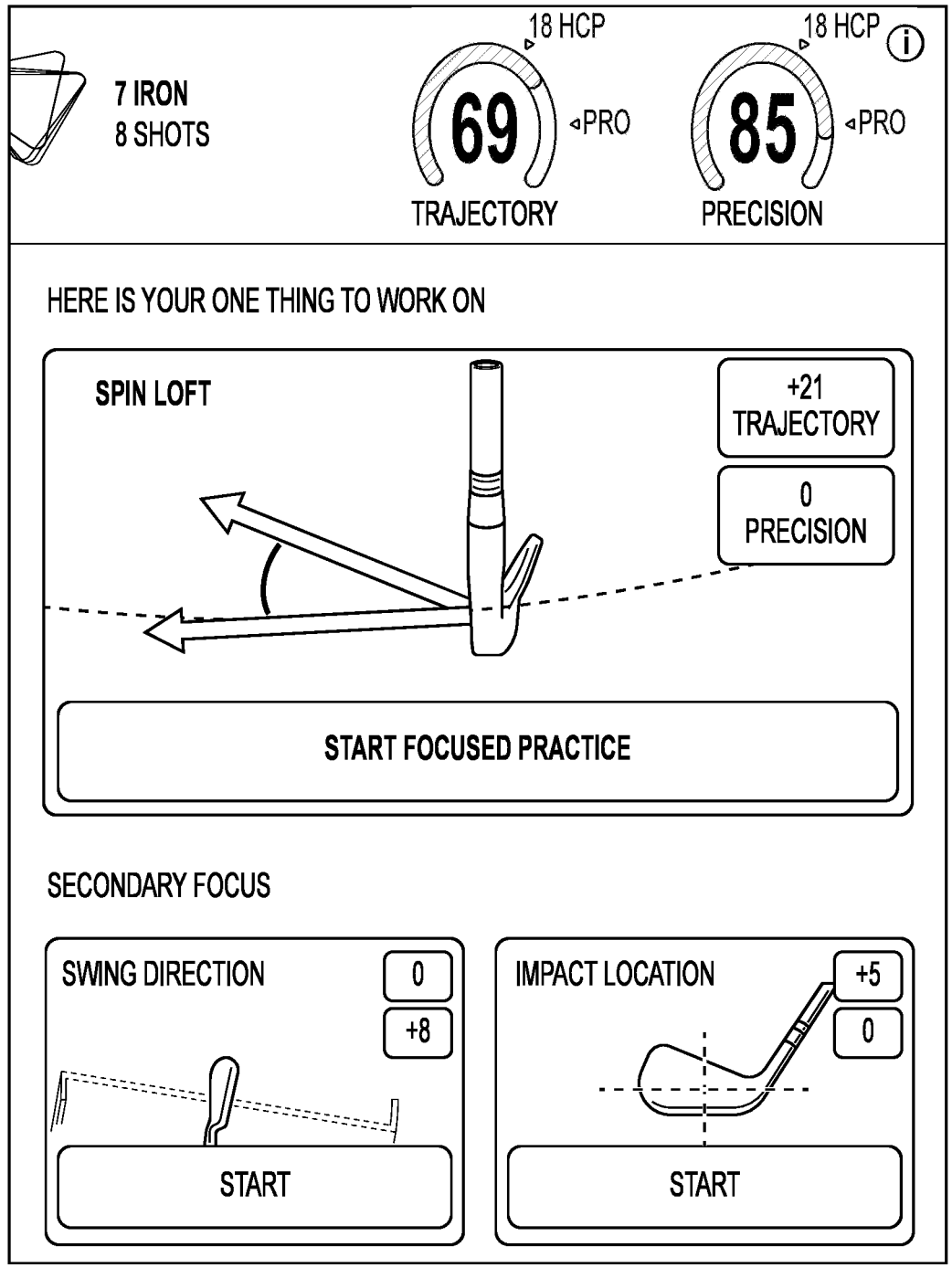
FIG. 6 shows an example of displaying, in prioritized order, golfer improvement subjects with direct access to a focused practice plan.

When determining the benchmark of the golfer performance in step 240, two different aspects are typically considered: 1) the actual shot shape of the golfer (e.g., possibly omitting poorly struck shots as described above), compared to the optimal shot determined in 230 (in FIGS. 5-6, this is called the trajectory score); and 2) the repeatability with which the golfer is able to execute the same shot (in FIGS. 5-6, this is called the precision score). The optimal golf shot determined in step 230 may very well be different from that corresponding to the golfer characteristics determined in step 220. If, for example, a golfer impacts a driver consistently on the heel of the club face, not only will the ball speed will be lower than optimal, the actual shape of the golfer's shots reflected in the golfer characteristics will likely be a fade shot because of the so-called horizontal gear effect due to the heel impact location, while the optimal shot shape may be a straight shot. The benchmarking may also include a scoring that reflects the golfer ability to land the ball consistently on a target or within a target area.

FIG. 5 shows an example of feedback provided to the golfer on the display 107. The benchmarking of the golfer's performance is in this case reflected in two parameters— trajectory and precision. Furthermore, the optimal trajectory and carry/total numbers are shown adjacent to the actual trajectory and carry/total numbers. Finally, a dispersion chart is shown which, in this example, indicates more shots are missed to the right than to the left of the target.

Based on the golfer characteristics determined in step 220 and the optimal shot of the golfer determined in step 230, a swing model 245 is calibrated to golfer's swing motion and club delivery characteristics. The processor 105 then analyzes potential improvements 250 by adjusting in the swing model all the parameters and/or swing changes possible to determine which parameters will have the biggest positive impact on the benchmarking of the golfer's performance. The potential improvement of the benchmarking performance is then compared for each of the parameters or swing changes while possibly also taking into account which changes are easier for the golfer to achieve. The results of the recommended improvements may then be presented to the golfer in step 250 as shown in FIG. 6. The recommended changes may include (a) only the change(s) that will have the biggest positive impact; (b) all the changes that will have a positive impact on the benchmark; or (c) one or more selected changes with positive impact on the benchmark.

In FIG. 6, both a trajectory score and a precision score are given. Thus, when determining the overall potential improvement, the two scores are combined. This combination may be done in a variety of ways. A simple approach is to give the two scores similar weights. This means that a total performance score may be the sum or average of the two scores. Other scoring mechanism, with more or different sub-scores may also or alternatively be done. However, it is preferable to combine the sub-scores into an overall score, to be able to rank the improvement recommendations.

Alternatively, each of multiple categories of improvement may have its own scoring mechanism. For example, one category may be efficiency/trajectory using only the trajectory score for ranking and another category may be precision using only the precision score for the ranking of improvements. The golfer may then decide which aspect of the game to improve from these categories.

When determining the recommendations in step 250, the expected relative effort required for the golfer to achieve the recommended change to a parameter or to the swing may be factored in. Also, some changes may be omitted from the analysis either automatically by the system 100 or by the golfer 130. For example, a golfer may decide to omit equipment changes or, vice versa, a golfer may ask to see recommendations only for equipment changes. The latter is typically what is done by a professional fitting instructor.

An alternative approach to determining the recommended improvements in step 250, may be where the swing model is determined in step 245 via an artificial intelligence system based on historical data of multiple golfers that had, in the past, similar swing motions or club delivery faults, as well as how well and how fast they improved over time and what changes they made to improve. The effectiveness of such a system would improve over time as more and more data are recorded and used by the system.

The improvements recommended to the golfer may lead to a personal focused training plan determined in step 260 for changing a particular parameter or swing movement. The training plan determined in step 260 may be supplemented by suggestions for different equipment in step 265 such as another type of club or a club having a different loft or spec's that differ in other regards as will be understood by those skilled in the art. The recommendation may also include, in step 268, suggestions for personal drills known to have a positive impact on the swing faults such as those shown by the golfer.

A further aspect of the present embodiments uses the player characteristics and recommendations to suggest to the golfer changes to the golfer's set of clubs—the so-called set makeup. The rules of golf permit a player to play a maximum of 14 clubs. However, there are many more than 14 club types available. So, every golfer must determine which club types to carry (e.g., driver, woods, hybrids, irons, wedges, putter) and select club specs for each of the selected clubs (e.g., loft, length, weight, etc.). Often the decisions of at which distances, to switch from woods to hybrids and from hybrids to irons, are based on feel. Based on the golfer characteristics determined in step 220 and the information retrieved from the database in step 235 as well as the swing model determined in step 245, the system 100 may suggest to a golfer changes to the golfer's clubs and/or club selection for various distances to maximize the benchmark performance determined in step 240 across all of the golfer's clubs. In this aspect, the system 100 may use information about the expected number of shots hit with each club during a typical round of golf.

A golfer typically considers the ability to hit a certain distance with some gapping, e.g., a golfer may prefer to have adjacent clubs spaced 10 m in carry distance for a full swing. However, this is typically not possible with all 14 clubs from the driver distance down to the shortest club like a lob wedge. Typically, golfers will prefer to have something like 10 m spacing between clubs up to the longest iron and possibly longest hybrid and then choose a larger distance spacing for the remaining longer clubs. The system 100 might determine the set makeup with a similar logic.

This recommendation for set makeup can be done even if the golfer has not hit all his/her clubs. In fact, a set makeup may be done after only a few shots have been analyzed by the system 100—even if these shots are all using a single club type. This is possible, since the way a golfer hits, for example, a 6 iron will be very similar to how the golfer hits a 4 iron or 9 iron or other clubs like driver and wedges. This is because the body motion to perform almost any type of golf shot—excluding putting and short chip shots—is fundamentally the same. In FIG. 9, the average of male tour professional golfers' club delivery and ball launch and flight data is shown. It is observed that the club delivery and ball launch data for neighboring clubs is very correlated, which shows that it is possible to predict the club delivery and ball flight details of one club based on data from another club. It has been found that this is, to a high degree, also the case for amateur golfers. However, typically a proper set makeup analysis involves hitting both a driver and one or more irons.

Yet, another aspect of the present disclosure is to use a database of golfer swing motion and club delivery characteristics to determine whether a particular piece of equipment will have a positive impact on a golfer's game. This can be used to identify a club that will be useful to golfers having certain swing characteristics in common. For example, a product may be identified as likely to have a positive effect on these golfers' performances given their swing characteristics.

Figure 7:
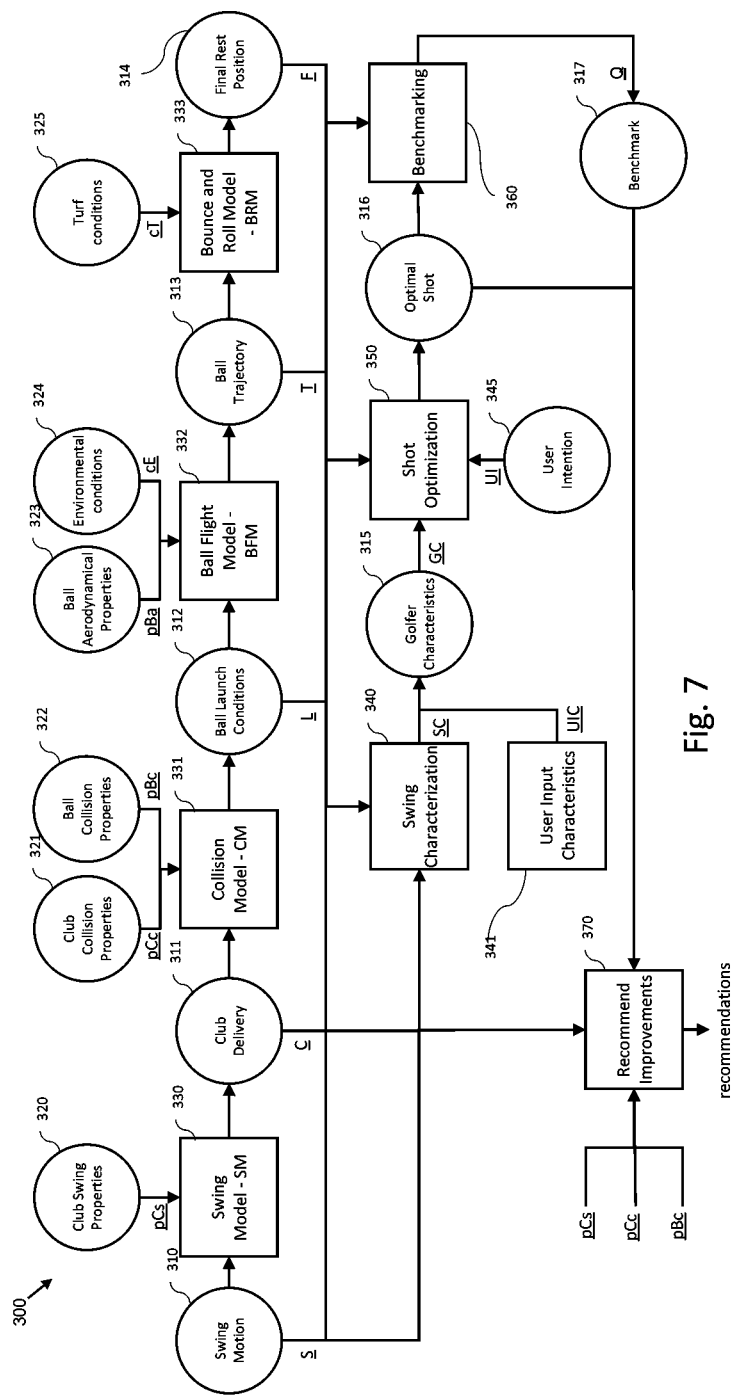
FIG. 7 shows an example of the implementation of the present embodiment.

In FIG. 7, an example of the implementation of an exemplary embodiment is shown. In FIG. 7, all circles represent measurements, parameters or properties, and the rectangular boxes are algorithms, processes or networks that from a given set of inputs produce an output.

FIG. 7 includes an example of a full model of the logical sequence of a golfer swing to ball trajectory shown in FIG. 3. Some embodiments weigh only use parts of the model shown in FIG. 7.

FIG. 7 shows an implementation 300 including a swing model (SM) 330 that can calculate the club delivery (C) 311 from the swing motion (S) 310 and club swing properties (pCs) 320. FIG. 7 also includes a collision model (CM) 331 that can calculate the ball launch conditions (L) 312 from the club delivery 311, the club collision properties (pCc) 321 and the ball collision properties (pBc) 322. A ball flight model (BFM) 332 then calculates the ball trajectory (T) 313 from the ball launch conditions 312, the ball aerodynamical properties (pBa) 323 and the environmental conditions (cE) 324 such as wind speed and direction, density of the air, temperature and air pressure. A bounce and roll model (BRM) 333 then calculates a final rest position of the ball (F) 314 from the ball trajectory 313, in particular, landing speed, landing angle and landing spin rate, and the turf conditions (cT) 325.

In the following various embodiments will be described. From the description of the different models above, it is clear that multiple variations of the embodiments can be achieved by either using the models described or by directly measuring the parameters. It is, for example, clear that if one knows the ball launch conditions 312, one does not need to determine or measure the ball trajectory 313 and the final rest position 314 directly, since the ball trajectory 313 and final rest position 314 may be calculated with reasonable accuracy using the ball flight model 332 and the bounce and roll model 333. In some embodiments, it is preferable to use the models 332, 333 as compared to directly measuring the parameters, and in other embodiments it is preferable to measure the parameters.

The first step in the present embodiment is the swing characterization (SC) 340 which is used to produce the golfer characteristics (GC) 315. This is typically done by recording the swing motion 310 and/or the club delivery 311 data for a number of shots. In addition, the ball launch conditions 312, ball trajectory data 313 and final rest position of the ball 314 may also be used for the same shots. The process might include intelligent filtering of well struck shots and less well struck or poorly struck shots.

In one example, the golfer characteristics 315 is described by the following: "82 mph club speed for a 6 iron, attack angle −3.2 degrees, face-to-path of −3 degrees, club path +1.4 degrees".

The swing characterization 340 may also include statistical description of the variability of the golfer described, for example, in terms of a standard deviation or 90% confidence interval or other statistical description. In some embodiments it may also be desirable to characterize shots that are not so well struck. Elite golfers are, in general, more interested in eliminating bad shots from their game as compared to marginally improving their good shots. So, a characterization of the swing motion and club delivery for those not so well struck shots may be of particular interest to these golfers.

To determine the optimal shot 316 for a golfer, a shot optimization 350 is carried out. The shot optimization 350 uses the golfer characteristics 315 as input. The golfer characteristics 315 can either be determined from the swing characterization 340 or it may be based on user input characteristics (UIC) 341 or other predetermined methods. Naturally, the golfer characteristics 315 may be a combination of the swing characterization 340 and user input characteristics 341.

When determining the optimal shot 316, the system 100 may use user intention (UI) 345. The user intention 345 may be expressed as a user intention of the type of shot desired (e.g., a preferred shot shape such as a high shot, low shot, fade, draw etc.) or other characteristics like specific carry distance or a range for landing, spin rate, etc.

The shot optimization 350 may also use the ball launch conditions 312, ball trajectory 313 and/or final rest position 314. As described above these may be calculated from the collision model 331, the ball flight model 332 and the bounce and roll model 333 depending on what measurements are available.

The optimal shot 316 can be represented in a variety of ways. It may be expressed with parameters describing the optimal swing motion Sopt; club delivery Copt; ball launch conditions Lopt; ball trajectory Topt; and/or final rest position Fopt. In the preferred embodiment, the optimal shot 316 is described by the optimal club delivery Copt and the optimal ball launch conditions Lopt, consisting of, for example, one or more optimal values for the club delivery parameters (e.g., club speed, club path, attack angle, face angle, dynamic loft, dynamic lie, impact location, etc.), as well as one or more of optimal values for the ball launch conditions parameters (e.g., ball speed, launch angle, launch direction, spin rate, spin axis, etc.).

In one embodiment, the shot optimization 350 uses the collision model 331, the ball flight model 332 and the bounce and roll model 333 to calculate various ball trajectories and final rest positions from a variety of club deliveries which are in the vicinity of the golfer characteristics 315 and determined to be achievable by the golfer. From the many various ball trajectories and a database of optimal trajectories, the optimal shot is found that is closest to the golfer characteristics 315. An example of optimal club deliveries and trajectories is shown in FIG. 9, which represents the average of a male tour professional golf player. The database which is part of the shot optimization 350 might consist of several thousands of club deliveries and ball launch conditions from professional golfers similar to that shown in FIG. 9, so it covers all kind of clubs, all kinds of club speed and all kinds of various shot shapes. The database may also be fully or partly replaced by the collision model 331 which is configured to consider efficient collisions only.

The benchmarking 360 is done by comparing the golfers actual ball launch conditions 312, ball trajectory 313 and/or final rest position 314 with the corresponding data for the optimal shot 316. The benchmarking 360 may also use the golfers swing motion 310 and/or club delivery 311 and compare to the corresponding optimal data. The benchmarking 360 is, to a high degree, a comparison of swing motion (S) 310 with Sopt, club deliver (C) 311 with Copt, ball launch conditions (L) 312 with Lopt, ball trajectory (T) 313 with Topt and/or final rest position (F) 314 with Fopt.

The result of the benchmarking 360 is the benchmark 317. The benchmark 317 is preferably expressed in one or more scores Q, that makes it possible to quantify the benchmark 317. In the preferred embodiment, two scores are calculated; a trajectory score $Q_{trajectory}$ which represents how well the golfer is able to achieve the optimal shot trajectory, typically using only the golfer's well hit shot, and a precision score $Q_{precision}$ which represents how well the golfer is able to make the ball end at the intended target, typically using all the shots from the golfer.

In the extreme case where the golfer is able to repeat the optimal shot every time, then the benchmark score will be maximum, like a score of 100 as in FIGS. 5 and 6 depending on the scale.

Figure 8:
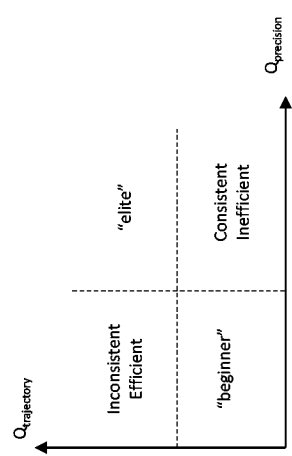
FIG. 8 shows a use of two benchmarking scores to categorize players in groups with similar issues.

The benchmark score 317 of the golfer may also be used to categorize the golfer. In FIG. 8, a categorization of a golfer is done on the basis of the achieved trajectory and precision score. This categorization can be done on all the golfer's club, on several golfers, or can be subdivided into golfers with similar club speeds. This type of categorization of the golfers, may be helpful to understand what type of service or products will benefit which type of golfers.

To determine the recommended improvements 370 for the golfer, all the various parameters that determine the ball trajectory and final rest position are tested to determine how much each parameter, or any combination of parameters, impacts the benchmark score 317. This can, for example, be done by adjusting each parameter from the golfer's actual value to the value corresponding to the optimal shot 316 and calculating the change in the benchmark score 317. This may be done on all the shots from the golfer or a subset of shots from the golfer. The parameters to test may include, for example, the golfer's swing motion S or club delivery C, club swing properties pCs, club collision properties pCc and/or ball collision properties pBc.

Mathematically the calculation for determining the recommendations may be done by calculating dQ/dP, where dQ is the change in the benchmark score Q 317 when changing the parameter (or group of parameters) P from the actual value to the golfer's personal optimal value Popt (dP=Popt−P) corresponding to the optimal shot 316.

All parameter changes which will have a positive impact (dQ>0) on the benchmark score 317 can be recommended. However, in the preferred embodiment the recommendations are ranked according to how much each parameter change is expected to improve the benchmark score 317. In one embodiment, only the change that provides the biggest improvement in the benchmark score 317 is recommended—"what is the one thing to change that will have the biggest impact—most bang for the buck".

The recommendations may be filtered to show only changes within a certain category such as swing motion or club delivery changes—without recommending changes in other areas such as changes to equipment. The recommendations may also be restricted to show only equipment parameter changes such as changes to club shaft specifications, club head model specifications, ball type specifications, etc. The latter situation is typical for a fitting session, in which equipment is fitted to the golfer as the golfer actually swings the golf club.

The recommendations might be similar to that shown in the example of FIG. 6, where "spin loft" has been identified as the most impactful parameter, which if made optimal, would most increase the benchmark score 317. In FIG. 6, less impactful recommendations, but with still noticeable positive impacts, are also suggested (e.g., changes in swing direction, impact location, etc.). The recommendations for improving a particular parameter like "spin loft" may be associated with the optimal value and an acceptable range (e.g., spin loft needs to be 25.5 degrees within +−1 degree) that reflects a natural variability in both golfer consistency as well as measurement tolerances. The acceptable range may also be adjusted to reflect a skill level of the golfer.

Note that the recommendation to improve a specific parameter may be directed to changing the average value of the parameter achieved by the golfer, but may also be directed to reducing the variability of the parameter even when the average actual value achieved by the golfer equals the optimal value. Most often both the average and variability are recommended to be improved.

An example of a recommendation may be to change the golfer's attack angle with a Driver from an average of 0 degrees to an average of +5 degrees. The system may further calculate the improvements expected to result from this change. For example, the system may compute that, if a particular flaw is eliminated or minimized, the golfer may achieve an increased carry distance of 11 yards and an improvement on the benchmark score 317 of 5 points (e.g., on a scale from 0 to 100). This type of motivation for a golfer to follow the recommendations cannot be provided by an instructor or a coach, but requires a system with a processor capable of making all the necessary calculations to process, for example, many shots by the golfer and perhaps hundreds of other golfer's as well.

Additional embodiments provide to a user unique output not available from a human coach. For example, a video of a swing by the golfer may be overlaid with data illustrating changes in positioning of different body parts to be made to implement a swing change recommendation. For example, the video may be altered (e.g., by overlaying graphics or a separate video image) showing a desired repositioning of the feet relative to the ball to achieve a desired change in attack angle or to show a new path to be followed by a shoulder or elbow to achieve another desired change. The changes so recommended by the system 100 may also be recorded and the data tagged with this information so that subsequent changes in performance may be associated with the swing change recommendation. Those skilled in the art will understand that the system 100 may also measure and record data corresponding to subsequent golf shots of the player to measure the degree to which these suggested swing changes were actually implemented by the golfer. This data may also be associated with the swing change recommendation and correlated to the measured change in performance of the golfer over time.

As would be understood by those skilled in the art, this enables the building of a database with multiple shots from a variety of golfers having various biometric and swing characteristics so that a neural network may be trained to more accurately identify the changes most likely to lead to improvement for a specific golfer and to quantify the potential improvement associated with the implementation of a given recommendation. For example, a golfer receiving the data shown in FIG. 6 may implement the change suggested and the subsequent change in performance of the golfer is measured and recorded (while also recording the golfer's actual physical swing changes in response to the recommendation).

The system 100 may also track the time and results of the associated focused practice suggested to the golfer. This data is then stored in the database and the data for this golfer and all others (or any selected subset of golfers having, for example, one or more selected characteristics in common) that received the same or a similar suggestion may then be used to train a neural network that compares the predicted results to those actually obtained. This will allow the neural network to identify golfer characteristics that indicate a greater or lesser potential for positive change due to any suggestion and improve the ranking and quantification of the suggested changes and their associated potential impacts on a particular golfer's game. In addition, by reviewing focused practice data, the neural network may identify golfer characteristics that render a particular practice regimen more of less effective for any given golfer.

Those skilled in the art will also understand that an embodiment need not progress all the way to the identification of specific recommendations for focused practice to be valuable. A system 100 that simply identifies, based on the analysis above, one or more of the most impactful changes in, for example, ball striking, a golfer or coach may choose a means of making this change to improve the efficiency of practice. If such a system were then to provide data regarding the optimal shot trajectory to the golfer this would be more valuable still as the golfer will then appreciate the actual changes in ball flight that will result from the improvements suggested. Finally, a system may compute a benchmark as described above based on the optimal shot to provide more data that is not calculable by a human.

Those skilled in the art will understand that the systems of the embodiments combine and analyze various parameters and generate data that result from subtle interactions of many factors which has not previously been attainable to allow players of sports to understand the quantitative results obtainable by different courses of action in a novel manner not available through human providers of advice and coaching. Furthermore, those skilled in the art will understand that much of this data generated by the type of radar and image-based sports ball tracking systems along with historical data that can show changes in performance for individual golfers may be used to train neural networks to tease out relations between large numbers of variables in ways far beyond the capacity of the human mind to generate an entirely new class of data. Various changes may be made to the embodiments without departing from the scope thereof which is intended to be limited only by the claims appended hereto.

What is claimed is:

1. A system for determining potential changes in trajectories of golf shots, comprising:
   a sensor array sensing swing data including one or more swing parameters relating to a swing motion or a club delivery for each of a plurality of swings by a golfer and trajectory data relating to trajectories of each of a plurality of shots resulting from the plurality of swings;
   a computing arrangement including a data repository and a processor, the processor configured to perform the following steps:
   store in the data repository the swing data and the trajectory data;
   determine swing and shot characteristics for the golfer based on the swing data and the trajectory data, the swing characteristics including swing motion or club delivery parameters representative of the golfer and the shot characteristics including trajectory or precision parameters representative of the golfer;
   determine an optimal shot achievable by the golfer based at least on the swing and shot characteristics for the golfer, the optimal shot being associated with swing motion or club delivery parameters achievable by the golfer that result in an improved trajectory or precision relative to the trajectory or precision parameters representative of the golfer; and
   generate output data indicating the optimal shot achievable by the golfer or the swing motion or club delivery parameters associated with the optimal shot.

2. The system of claim 1, wherein the processor is configured to identify shots hit by the golfer that represent mishits and wherein the swing data includes a club speed for at least a portion of the shots hit by the golfer, and wherein the optimal shot is determined based on the club speeds of the shots hit by the golfer not identified as mishits.

3. The system of claim 2, wherein the swing data includes, for at least a portion of the shots hit by the golfer at least one of an attack angle, a club path, a dynamic loft and a face angle.

4. The system of claim 3, wherein the processor further determines a precision score for the golfer based on the trajectory data indicating a likelihood that a shot by the golfer will land within a target area, and wherein the processor also determines a trajectory score for the golfer based on the trajectory data indicating a degree of correspondence between the trajectories of the shots hit by the golfer and a trajectory associated with the optimal shot.

5. The system of claim 4, wherein the processor further identifies a change to the club delivery that will have a positive effect on one of the precision score and the trajectory score.

6. The system of claim 1, wherein the processor is configured to identify shots hit by the golfer that represent mishits and wherein the output data is based on all of the shots hit by the golfer that are not identified as mishits.

7. The system of claim 1, wherein the computing arrangement is configured to:
   store in the data repository the swing data and the trajectory data;
   identify shots hit by the first golfer that represent mishits;
   determine output data based on the swing data and the trajectory data, the output data indicating an optimal shot achievable by the first golfer;

create a first training set comprising potential first comparison data from the data repository including swing and trajectory data for a plurality of golf shots for each of a plurality of additional golfers, the first potential comparison data including potentially comparative golfer data corresponding to ones of the additional golfers having swing and trajectory data preliminarily identified as corresponding to the swing and trajectory data of the first golfer;

train a neural network using the potential comparison data and data corresponding to changes in the golf shots of the first golfer before and after one of a swing change recommendation and an equipment change recommendation;

create a second training set comprising ones of the golfers identified in the first comparison data that showed progress similar in magnitude to that of the first golfer from before to after receipt of the same one of a swing change recommendation and the equipment change recommendation received by the first golfer; and train the neural network using the second training set.

8. The system of claim 7, wherein, when the one of a swing change recommendation and an equipment change recommendation is a swing change recommendation, the output data includes video of the first golfer overlaid with data illustrating the swing change recommendation.

9. A method for training a golfer, comprising:

sensing, by a sensor array, swing data including one or more swing parameters relating to a swing motion or a club delivery for each of a plurality of swings by a golfer and trajectory data relating to trajectories of each of a plurality of shots resulting from the plurality of swings;

storing, in a data repository, the swing data and the trajectory data;

identifying, by a processor, one or more of the plurality of shots as a mishit, wherein the mishits are identified as certain shots that are less successfully executed than other shots in the trajectory data; and determining, by the processor, an optimal swing motion or an optimal club delivery and an optimal trajectory achievable by the golfer based on the swing data and trajectory data for the plurality of shots while excluding from the determination those shots identified as mishits.

10. The method of claim 9, wherein the swing data includes a club speed for at least a portion of the shots hit by the golfer, wherein the optimal club delivery is determined based on the club speed for the shots hit by the golfer that are not identified as mishits.

11. The method of claim 9, wherein the swing data includes, for at least a portion of the shots hit by the golfer an attack angle, club path, a dynamic loft and a face angle.

12. The method of claim 9, further comprising:

determining a precision score for the golfer based on the trajectory data indicating a likelihood that a shot by the golfer will land within a target area; and determining a trajectory score for the golfer based on the trajectory data indicating a degree of correspondence between the trajectories of the shots hit by the golfer and the optimal trajectory.

13. The method of claim 12, further comprising:

identifying a change to the golfer's club delivery that will have a positive effect on one of the precision score and the trajectory score for the golfer.

14. The method of claim 9, further comprising:

determining by the processor based on the swing data and the trajectory data for all of the shots hit by the golfer that are not identified as mishits the optimal trajectory achievable by the golfer.

15. A system for determining potential changes in trajectories of golf shots, comprising:

a sensor array sensing swing data including one or more swing parameters relating to a swing motion or a club delivery for each of a plurality of swings by a first golfer and trajectory data relating to trajectories of each of a plurality of shots resulting from the plurality of swings;

a computing arrangement including a data repository and a processor, the processor configured to perform the following steps:

store in the data repository the swing data and the trajectory data;

create a training set comprising potential comparison data from the data repository including swing and trajectory data for a plurality of golf shots for each of a plurality of additional golfers, the first potential comparison data including potentially comparative golfer data corresponding to ones of the additional golfers having swing and trajectory data preliminarily identified as corresponding to the swing and trajectory data of the first golfer; and train a model using the potential comparison data and data from the data repository for each of the plurality of additional golfers including swing and trajectory data representing the progress of the additional golfers over time.

16. The system of claim 15, wherein the data in the data repository includes data representing swing and equipment change recommendations associated in time to the data from the plurality of additional golfers and wherein this data is included in the training set.

17. The system of claim 15, wherein the processor is configured to identify shots hit by the first golfer that represent mishits.

18. The system of claim 15, where the model is a neural network.

19. The system of claim 1, wherein the sensor array includes at least one or more cameras, one or more radars, or one or more lidars.

20. The method of claim 9, wherein the sensor array includes at least one or more cameras, one or more radars, or one or more lidars.

* * * * *